United States Patent
Copley et al.

(10) Patent No.: US 11,975,287 B2
(45) Date of Patent: May 7, 2024

(54) PLEATED CHANNEL FLOW FILTER AND/OR ROLL FORM METHOD

(71) Applicants: Daniel J. Copley, Westpoint, TN (US); Brian Ehrenberg, Kansas City, MO (US); Jason L. Tate, Thompsons Station, TN (US)

(72) Inventors: Daniel J. Copley, Westpoint, TN (US); Brian Ehrenberg, Kansas City, MO (US); Jason L. Tate, Thompsons Station, TN (US)

(73) Assignee: Parker-Hannifin Corporation, Cleveland, OH (US)

(*) Notice: Subject to any disclaimer, the term of this patent is extended or adjusted under 35 U.S.C. 154(b) by 281 days.

(21) Appl. No.: 17/231,395

(22) Filed: Apr. 15, 2021

(65) Prior Publication Data

US 2021/0229021 A1  Jul. 29, 2021

Related U.S. Application Data

(63) Continuation of application No. PCT/US2019/055384, filed on Oct. 9, 2019.

(60) Provisional application No. 62/824,145, filed on Mar. 26, 2019, provisional application No. 62/746,069, filed on Oct. 16, 2018.

(51) Int. Cl.
  *B01D 46/52* (2006.01)
  *B01D 46/00* (2022.01)
  *F02M 35/024* (2006.01)

(52) U.S. Cl.
  CPC ....... *B01D 46/523* (2013.01); *B01D 46/0001* (2013.01); *F02M 35/0245* (2013.01)

(58) Field of Classification Search
  CPC .............. B01D 46/0001; B01D 46/523; F02M 35/0245
  USPC .......................................... 55/497, 502, 521
  See application file for complete search history.

(56) References Cited

U.S. PATENT DOCUMENTS

| 3,490,211 A | 1/1970 | Cartier |
| 3,531,920 A | 10/1970 | Hart |
| 4,410,427 A | 10/1983 | Wydeven |
| 4,615,804 A * | 10/1986 | Wright ................. B01D 46/523 210/493.1 |

(Continued)

FOREIGN PATENT DOCUMENTS

| DE | 1930715 A1 | 11/1970 |
| DE | 60113952 T2 | 7/2006 |

(Continued)

OTHER PUBLICATIONS

Abstract of EP 1040859 A2 (Year: 2000).*
Abstract of GB 1050356 A (Year: 1964).*

*Primary Examiner* — Charles S Bushey
(74) *Attorney, Agent, or Firm* — Reinhart Boerner Van Deuren P.C.

(57) ABSTRACT

A roll forming method may be used to provide a pleated filter media pack and filter cartridges with channels formed. The pack includes a strip of a filter media extending opposed edges and opposed front and back sides. The strip is pleat tips with spacer structure such as integrally formed embossments maintaining a spacing between pleat panels. The inlet and outlet flow faces are created by the edges of the filter media rather than the pleat tips. Alternating pairs of pleat panels are closed such as by seal beads at the inlet and outlet flow faces.

31 Claims, 8 Drawing Sheets

(56) References Cited

U.S. PATENT DOCUMENTS

| | | | |
|---|---|---|---|
| 5,066,400 A * | 11/1991 | Rocklitz | B01D 29/012 |
| | | | 210/493.5 |
| 5,744,036 A | 4/1998 | Choi | |
| 6,045,597 A * | 4/2000 | Choi | B01D 46/0001 |
| | | | 55/497 |
| 6,165,241 A * | 12/2000 | Choi | B01D 46/0001 |
| | | | 55/497 |
| 6,375,700 B1 | 4/2002 | Jaroszczyk et al. | |
| 6,482,247 B2 * | 11/2002 | Jaroszczyk | B01D 46/121 |
| | | | 55/502 |
| 6,669,913 B1 | 12/2003 | Haberkamp | |
| 6,743,317 B2 | 6/2004 | Wydeven | |
| 6,824,581 B1 | 11/2004 | Tate et al. | |
| 7,318,851 B2 | 1/2008 | Brown et al. | |
| 7,323,105 B1 | 1/2008 | Janikowski et al. | |
| 7,425,227 B1 * | 9/2008 | Hutchison | B01D 46/523 |
| | | | 55/497 |
| 7,625,418 B1 * | 12/2009 | Choi | B01D 29/07 |
| | | | 210/493.1 |
| 8,277,532 B2 | 10/2012 | Reichter et al. | |
| 9,132,374 B2 | 9/2015 | Schaeper | |
| 9,724,635 B2 | 8/2017 | Merritt et al. | |
| 2006/0065592 A1 * | 3/2006 | Terres | B01D 46/121 |
| | | | 55/497 |
| 2006/0091061 A1 | 5/2006 | Brown | |
| 2007/0251634 A1 | 11/2007 | Choi | |
| 2008/0011673 A1 * | 1/2008 | Janikowski | B01D 46/0043 |
| | | | 55/467 |
| 2013/0219844 A1 * | 8/2013 | Sullivan | B01D 46/522 |
| | | | 55/496 |
| 2016/0045848 A1 * | 2/2016 | Campbell | B01D 46/10 |
| | | | 55/497 |
| 2016/0236132 A1 | 8/2016 | Hara et al. | |
| 2017/0014743 A1 | 1/2017 | Varghese et al. | |
| 2018/0214806 A1 | 8/2018 | Tate et al. | |

FOREIGN PATENT DOCUMENTS

| | | | |
|---|---|---|---|
| EP | 1040859 A2 * | 10/2000 | |
| EP | 2168649 A1 | 3/2010 | |
| GB | 1050356 | * 12/1966 | |

\* cited by examiner

PLEATED CHANNEL FLOW FILTER AND/OR ROLL FORM METHOD

CROSS-REFERENCE TO RELATED PATENT APPLICATIONS

This patent application is a continuation of co-pending PCT Patent Application No. PCT/US2019/055384, filed Oct. 9, 2019, the entire teachings and disclosure of which are incorporated herein by reference thereto. This patent application claims the benefit of U.S. Provisional Patent Application No. 62/824,145, filed Mar. 26, 2019, and U.S. Provisional Patent Application No. 62/746,069, filed Oct. 16, 2018. The entire teachings and disclosure of each of which are incorporated herein by reference thereto.

FIELD OF THE INVENTION

The present invention relates generally to an engine air intake filters and filter media packs, and more particularly relates to channeling and sealing methods to provide passage for air flow entering and exiting perpendicular to the sides of the pleated media assembly.

BACKGROUND OF THE INVENTION

Known filter cartridges with corrugated or fluted media packs include U.S. Pat. Nos. 8,277,532; 4,410,427; and 9,724,635. These filter media packs require individual cut strips that are then stacked and laid and sealed upon each other with strips of adhesive beads. Other filter packs known are traditional pleated filter media packs such as panel filters as described U.S. Pat. No. 6,824,581 entitled "Pleated filter media with embossed spacers and cross flow". For example, US Publication No. 2017/0014743 entitled "Multi-component Holding Assembly For Multiple-Panel Air Filter" demonstrates a concept of using two pleated filter media packs in a common holding frame with the pleated packs inclined to each other in a V-formation.

In order to provide an engine air filter having both high dust loading capacity and low flow restriction it is desirable to accommodate a large surface area of filtering material inside a small package envelope, or 'space claim'. Within the automotive industry, pleated paper filter packs are the most commonly applied method of achieving this goal and are typically manufactured in either flat panel or cylindrical element configurations, both solutions having air enter perpendicular to the apex of each pleat (e.g. such as shown in the aforementioned '581 patent and the '743 publication). These solutions are known to suffer several problems. The nature of a 'V' shaped pleat is that it tapers towards its root. Any curvature in the walls of the pleat produced during high speed manufacture blinds the use of a portion of the filtering material and renders it less effective for filtration. Similarly, bunching or unequal spacing of pleats creates the same issue within over compressed areas of the filter or the underutilization of available package space in the case of rarefaction. The depth of pleats which can be effectively manufactured is therefore limited (up to approximately 100 mm) and the attainable surface area of filtering media within a given cross sectional area of air passageway is consequently constrained.

Methods employing embossment of filter media have been developed to alleviate this issue and are described by the aforementioned '581 patent. US2007/0251634 and others. The addition of secondary spacer materials such as adhesives are also used to better control pleat geometry.

Many attempts have been made to improve on the techniques above including a widely employed solution known as fluting disclosed for example by U.S. Pat. No. 4,410,427 to Wydeven. This process utilizes a tightly corrugated media which has a secondary flat backing sheet adhered to it. By closing opposing ends of successive layers of this composite construction a series of flutes are formed, down which contaminated air must travel. Because the end of each inlet flute is closed, air must pass through the filtering material into an adjacent open-ended flute in order to exit the filter element axially. This substantially solves the aforementioned problem of blinding by producing a physically well constrained filter with precise geometry and consistent performance. While the effective surface area of material within a given package volume is improved, several undesirable issues remain. For example, this media requires successively cutting the media in short strips that must be then aligned and stacked, which is time consuming and requires additional steps.

The most economical construction method for such traditional fluted media packs is limited to cylindrical or oval shapes which can be wound on a rotating mandrill from the composite assembly of the corrugated and flat backing sheet such as shown in U.S. Pat. No. 7,318,851 entitled "Filter element". However, even these conventionally still use two separate cut sheets and then additionally require winding. Rectangular or rhomboid package shapes are complicated to make are constructed by cutting many individual lengths of the fluted media composite and gluing them together as shown in the '532, '427, and '635 patents as earlier referenced. The sides of this construction must subsequently be completely sealed to prevent bypass of contaminated air resulting in a slow and costly assembly process.

Additionally, filtering air through small closed ended tubes presents other problems, notably the entry to these flutes can easily be bridged with contaminant, blocking the flow of air and preventing filtration those tubes. There is also no path for water droplets entering these small passageways to exit. In wet weather conditions the tubes become filled with water and structural integrity of the filter can be lost.

Finally another concept that is proposed in the art is to pleat a filter but seal opposed ends such as shown in U.S. Pat. No. 6,375,700. However, this concept suffers from blinding off problems and to reach sizeable packs, multiple different cut pleated media panel members are stacked upon each other to create a useable filter media pack, requiring additional sealing between adjacent pleated media panel members, especially if the housing gasket is not diagonally arranged upon the pack.

BRIEF SUMMARY OF THE INVENTION

In an embodiment, unlike convention pleated filters, a pleated filter media pack is employed in a filter media pack that may be used in a filter cartridge, however, the inlet and outlet faces may be provided by opposite edges of the filter pack rather than only the pleat tips as would be the case in a conventional pleated panel filter. Further other advantageous configurations and/or structures such as spacers (e.g. preferably embossments) may be employed to facilitate a working filter media pack configuration. Preferably, high speed roll form pleating can be employed to construct an embossed edge/end flow type filter media pack. High speed roll form pleating can provide significant processing advantages, while providing an advantageous filter media pack configuration.

According to an inventive aspect, a filter media pack, comprises a strip of a filter media extending between a first edge and a second edge that has a first side and second side. The strip is pleated to provide a first plurality of pleat tips and a second plurality of pleat tips with pleat panels extending between pleat tips. A spacer structure maintains a spacing between pleat panels. An inlet flow face is created by the first edge and an outlet flow face created by the second edge, with the pleat tips extending transversely between the inlet face and the outlet face, and with alternating first pairs of pleat panels being closed proximate the inlet flow face and second pairs of pleat panels being closed proximate the outlet flow face.

While other alternatives are possible, preferably, the spacer structure comprises a plurality of embossments integrally formed into the strip of the filter media and arranged to maintain a spacing of pleat panels. Preferably, the embossments are arranged to create a pleat spacing of at least 2 millimeters. Each of the pleat panels may include embossments. Alternatively, the pleat panels include alternating flat panels free of embossments and embossed panels having the embossments, in which the embossed pleat panels may contact the flat pleat panels. While flat regions between embossments provide certain advantages, alternatively and optionally, embossments on the embossed panels may be continuous without flat regions therebetween.

Preferably, the embossments comprise a plurality of flutes formed into the filter media, with the flutes extending between the inlet face and the outlet face in either a continuous or discontinuous manner. Preferably, the flutes are aligned parallel with the pleat tips.

When flutes are employed, the flutes may have a depth of at least 2 millimeters, with adjacent members of pleat panels being spaced between 2 and 8 millimeters, and flat regions of the filter media may be arranged between adjacent members of pleat panels with the flat regions extending a width at least twice a width span of the embossments.

When embossments are used, the embossments may include male and female embossments formed into the filter media sheet, with the male embossments projecting outwardly along the first side and the female embossments projecting outwardly along the second side.

In one embodiment, flat regions of the filter media are formed between adjacent embossments, wherein the embossments of a first pleat panel contact flat regions along a second pleat panel.

In another embodiment, embossments formed along first pleat panels contact embossments formed along second pleat panels, wherein spacing between pleat panels is greater than a depth of the embossments as a combination the embossments along both the first pleat panels and second pleat panels.

Preferably, each pleat tip may be formed by at least two creases, with the creases extending between the inlet face and the outlet face to provide a pleat tip with a width that is preferably at least 2 millimeters to space adjacent members of pleat panels apart.

Preferably, the filter media pack is configured with a first sealant bead applied to the first side proximate the first edge to sealingly close the first pairs of pleat panels proximate the inlet face; a second sealant bead applied to the second side proximate the second edge to sealingly close the second pairs of pleat panels proximate the outlet face.

Preferably, the filter media pack is constructed with the pleated strip that comprises a pleat depth that most typically is at least 4 inches (and that may be 6 inches or more in other embodiments), however in some embodiments smaller pleats heights may be used including but not limited down to 2 inches of pleat depth.

Preferably, the filter media pack is constructed with the strip that has a width extending between the first edge and the second edge of between 6 inches and 20 inches to provide a matching filter media pack depth extending between the inlet face and the outlet face.

Preferably, the filter media pack is constructed with the strip, wherein the filter media has a first cut side end and a second cut side end, and further comprises a first end seal along a first side of the filter media pack sealing between adjacent pleat panels at the first cut side end, and a second end seal along a second side of the filter media pack sealing between adjacent pleat panels at the second cut side end.

While integral embossments are preferred, such spacer structure may also comprise at least one of (in addition or in the alternative to embossments): (a) an adhesive spacer beads laid upon the filter media, and (2) a structural insert separate from the strip of the filter media that is inserted between adjacent members of pleat panels.

Preferably, the spacer structure spaces adjacent member of pleat panels at a central location between the first edge and the second edge of at least 2 millimeters.

According to an inventive aspect, a method of forming the filter media pack is provided (such as but not limited to such a filter media pack as described above in any of the paragraphs herein with or without the optional/preferred features noted), in which the method comprises: roll forming the strip of the filter media to include a plurality of pleat creases and a plurality of embossments to provide for the spacer structures; pleating the filter media by folding the filter media at the plurality of pleat creases to form the pleat panels: and sealing between the first pairs of pleat panels proximate the inlet flow face and between the second pairs of pleat panels proximate the outlet flow face.

Preferably, the method may perform the roll forming with use of two cooperating rolls that rotate together to press the filter media therebetween with at least one score bar and a plurality of embossing bars on at least one of the two cooperating rolls, to form the corresponding creases and the embossments into the filter media in a single stage operation. The at least one score bar and the plurality of embossing bars extend axially relative to central axes of rotation of the two cooperating rolls. Preferably, each of the two cooperating rolls include embossing bars.

Preferably, the method can accomplish the sealing through applying an adhesive bead to the first and second sides in a horizontal direction while the strip of the filter media being advanced in a vertical direction, with the applying being conducted before the folding that forms the pleat panels.

The method may also include cutting the strip of the filter media to create a first cut side end and a second cut side end, and sealing sides of the filter media pack at along the first cut side and the second cut side between along first and second opposite sides that extend between the inlet face and the outlet face.

According to another inventive aspect, a filter cartridge arrangement may be generated from the filter media pack (such as but not limited to such a filter media pack as described above in any of the paragraphs herein with or without the optional/preferred features noted), in which is further provided an inlet border frame around the inlet face of the filter media pack; and/or an outlet border frame around the outlet face of the filter media pack.

According to another inventive aspect, a filter cartridge arrangement may be generated from the filter media pack (such as but not limited to such a filter media pack as described above in any of the paragraphs herein with or without the optional/preferred features noted), in which is further provided a housing seal at a periphery of the filter media pack and extending around the pack to prevent unfiltered fluid flow between the inlet face and the outlet face.

Preferably, in a filter cartridge arrangement, the strip of the filter media may have a first cut side end and a second cut side end, with a first end seal along a first side of the filter media pack sealing between adjacent pleat panels at the first cut side end, and a second end seal along a second side of the filter media pack sealing between adjacent pleat panels at the second cut side end.

According to another inventive aspect, a filter cartridge arrangement comprises: a filter media pack comprising a single strip of media in the form of a fluted sheet with opposite ends of the fluted sheet adhesively secured in alternating sequence, to define alternating inlet and outlet flow channels, open at one end and closed at the other, and extending between first and second, opposite, flow surfaces.

For the filter cartridge and/or for the filter media pack, preferably, the fluted sheet comprises a plurality of embossments integrally formed into the single strip and are configured to maintain a spacing of pleat panels, wherein the embossments have a depth of at least 1 millimeters, and wherein the embossments comprise a plurality of flutes formed into the filter media, the flutes extending between the inlet face and the outlet face in either a continuous or discontinuous manner to provide the fluted sheet.

For the filter cartridge and/or for the filter media pack, preferably, the flutes have a depth of at least 1 millimeters and wherein the single sheet is pleated to with pleat panels, with adjacent members of pleat panels being spaced between 2 and 8 millimeters, and wherein flat regions of the filter media are arranged between adjacent members of pleat panels, the flat regions extending a width at least twice a width span of the embossments.

For the filter cartridge and/or for the filter media pack, preferably, the single strip is pleated to provide a first plurality of pleat tips and a second plurality of pleat tips with pleat panels extending between pleat tips, the channels being defined between adjacent pleat panels.

For the filter cartridge and/or for the filter media pack, preferably, at least one of the pleat panels defines flutes to provide for the fluted sheet, wherein the flutes are aligned parallel with the pleat tips.

For the filter cartridge and/or for the filter media pack, preferably, each pleat tip is formed by at least two creases, the creases extending between the inlet face and the outlet face to provide a pleat tip with a width of at least 2 millimeters to space adjacent members of pleat panels apart.

For the filter cartridge and/or for the filter media pack, preferably, a first sealant bead and a second sealant bead applied to the opposite ends of the fluted sheet to adhesively secure the fluted sheet to itself.

For the filter cartridge and/or for the filter media pack, preferably, the single strip is pleated with pleats having a pleat depth that is greater than 4 inches (although the pleat depth may be at least 2 inches in some embodiments), and wherein single strip extends a span first and second, opposite, flow surfaces between 6 inches and 20 inches to provide a matching filter media pack depth extending therebetween.

Another inventive aspect is directed toward a filter media pack, comprising: a continuous strip of a filter media extending between a first edge and a second edge, with a first side and second side. The continuous strip is pleated to provide a first plurality of pleat tips and a second plurality of pleat tips with pleat panels extending between pleat tips, with the continuous strip comprising a pleat depth that is greater than 2 inches. A plurality of embossments are integrally formed into the continuous strip of the filter media. The embossments projecting along the pleat panels wherein flat regions of the filter media are arranged between embossments. An inlet flow face is created by the first edge and an outlet flow face created by the second edge. The pleat tips extend transversely between the inlet face and the outlet face, with alternating first pairs of pleat panels being closed proximate the inlet flow face and second pairs of pleat panels being closed proximate the outlet flow face. A first sealant bead applied to the first side proximate the first edge to sealingly close the first pairs of pleat panels proximate the inlet face; and a second sealant bead applied to the second side proximate the second edge to sealingly close the second pairs of pleat panels proximate the outlet face.

Preferably, the continuous strip comprises a pleat depth is that is at least 4 inches, and wherein the embossments have a depth of at least 2 millimeters. The embossments may comprise a plurality of flutes formed into the filter media, with the flutes extending between the inlet face and the outlet face in either a continuous or discontinuous manner. The continuous strip has a width extending between the first edge and the second edge of between 6 inches and 20 inches to provide a matching filter media pack depth extending between the inlet face and the outlet face.

The embossments can provide spacer structures maintaining a spacing between pleat panels by being arranged to contact embossments projecting along pleat panels and/or by being arranged to contact the flat regions on the adjacent member of the pleat panels.

Preferably, each pleat tip is formed by at least two creases, with the creases extending between the inlet face and the outlet face to provide a pleat tip with a width of at least 2 millimeters to space adjacent members of pleat panels apart. Preferably, the width of the pleat tips match the spacing between pleat panels and/or spacing afforded by embossment structures.

Preferably, the continuous strip of the filter media has a first cut side end and a second cut side end, and the filter media pack may further comprise a first end seal along a first side of the filter media pack sealing between adjacent pleat panels at the first cut side end, and a second end seal along a second side of the filter media pack sealing between adjacent pleat panels at the second cut side end.

Another inventive aspect is directed toward method of forming a filter media pack, comprising: roll forming a strip of a filter media to include a plurality of pleat creases and a plurality of embossments: pleating the filter media by folding the filter media at the plurality of pleat creases to form the pleat panels with the embossments arrange to space adjacent pleat panels apart: and sealing between the first pairs of pleat panels proximate an inlet flow face and between the second pairs of pleat panels proximate an outlet flow face, with the pleat creases extending between the inlet flow face and the outlet flow face.

Roll forming may comprise use of two cooperating rolls that rotate together to press the filter media therebetween with at least one score bar and a plurality of embossing bars on at least one of the two cooperating rolls, to form the corresponding creases and the embossments into the filter media in a single stage operation. The at least one score bar and the plurality of embossing bars extending axially (and preferably parallel) relative to central axes of rotation of the two cooperating rolls.

Each of the two cooperating rolls may include embossing bars.

The sealing may be accomplished by applying an adhesive bead to the first and second sides of the strip in a horizontal direction while the strip of the filter media being advanced in a vertical direction, the applying being conducted before the pleating that forms the pleat panels.

The method may involve cutting the strip of the filter media to create a first cut side end and a second cut side end, and sealing sides of the filter media pack at along the first cut side and the second cut side between along first and second opposite sides that extend between the inlet face and the outlet face.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIGS. 7-10 show alternative embossment arrangements in which embossments may project from only one side, some portions may not have embossments and that contact between sheets may not necessarily occur, and/or alternating non-embossed flat pleat panels with embossed pleat panels (and that the embossments on the embossed pleat panel may be continuous or not separated by flat regions on the pleat panel).

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
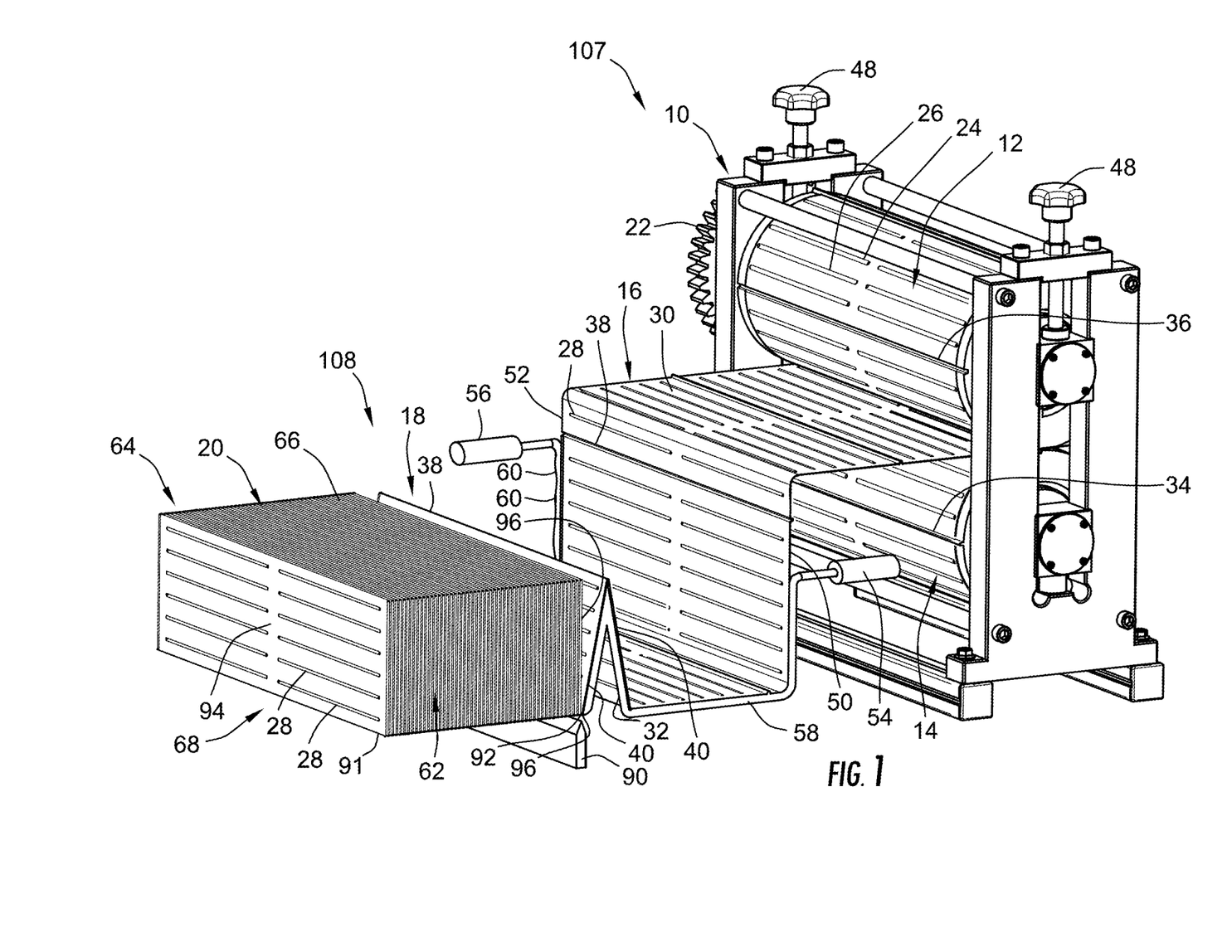
FIG. 1 is a partly schematic and isometric view of the roll form apparatus comprising cooperating rolls that form filter media with a plurality of pleat creases and a plurality of embossments that are gathered together with adhesive beads being applied, in order to form a filter media pack in accordance with an embodiment of the present invention.

Turning to FIG. 1, a roll form apparatus 10 includes a pair of cooperating rolls including upper roll 12 and lower roll 14 that work in cooperation to press (and may advance) a continuous strip of filter media 16 in order to form pleats 18 into the filter media. The pleats 18 are gathered together to form a filter media pack 20 in accordance with an embodiment of the present invention.

The two cooperating rolls 12, 14 can be driven such as by inter-meshed gears 22 that keep the angular orientation of the respective rolls 12, 14 that are synchronized with each other such that mating features on the respective rolls stay synchronized. The gear mechanism 22 can be driven by an appropriate drive motor that rotates the cooperating rolls such that they rotate together to press the strip of filter media 16 therebetween. Cooperating rolls include mating ribs 24 (also referred to as embossing bars) and optionally recesses 26 that when pressed together with the filter media therebetween form corresponding embossments 28 into the strip of filter media 16. As shown herein, each of the rolls 12 include alternating ribs 24 and recesses 26 such that the top and lower sides 30, 32 of the strip of filter media 16 each include projecting embossments 28 on one side and therefore corresponding recess embossments 28 on the other side.

However, it is also appreciated and contemplated that in other embodiments particularly for synthetic medias that embossment projections 28 may only project from either the top side 30 or the lower side 32 rather than both (see e.g. FIGS. 7-10 for contemplated schematic embossing alternatives). In that instance, one of the rolls 12 and 14 will include only embossment rib 24 features while the other will include corresponding embossment recess 26 features.

Figure 2:
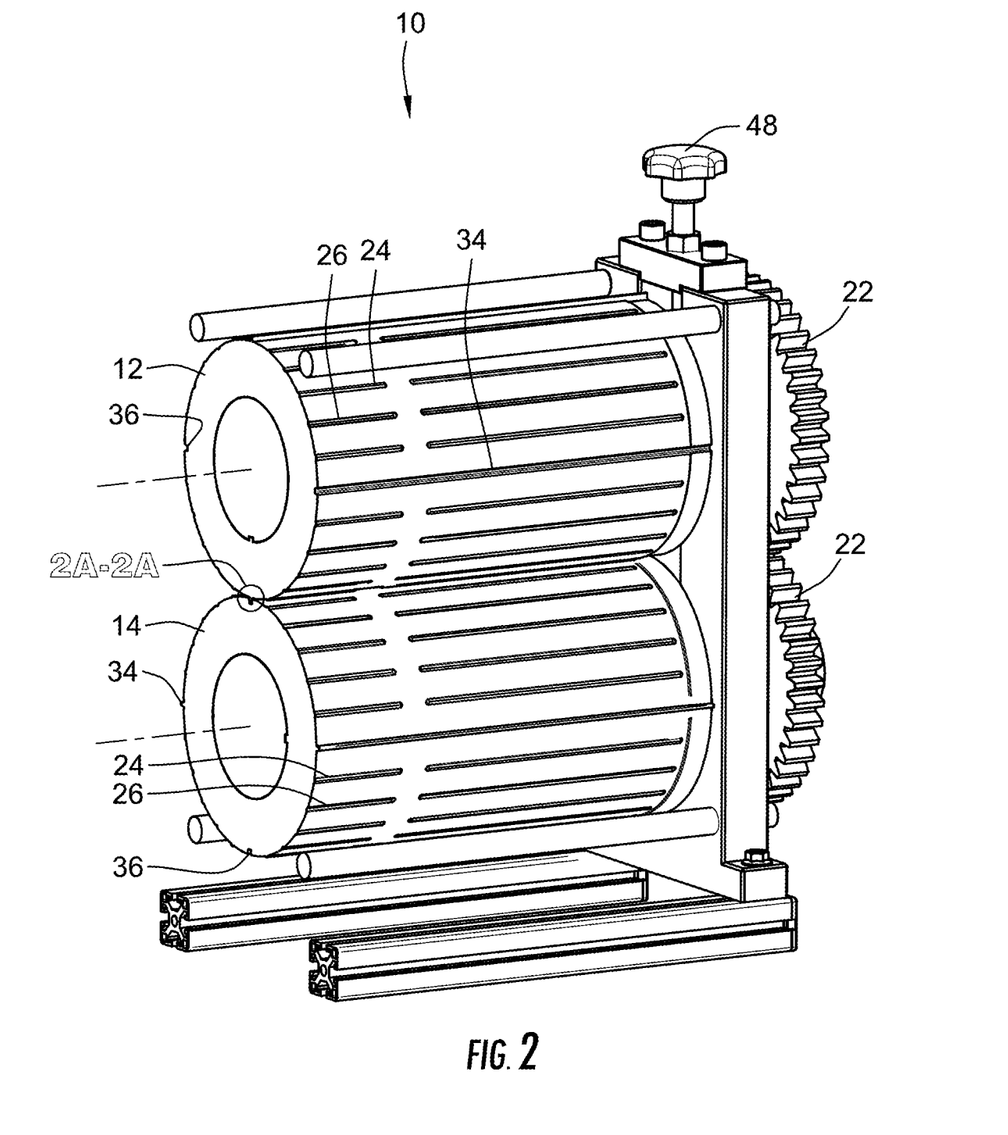
FIG. 2 is another isometric view of the roll form apparatus shown in FIG. 1.
Figure 2A:
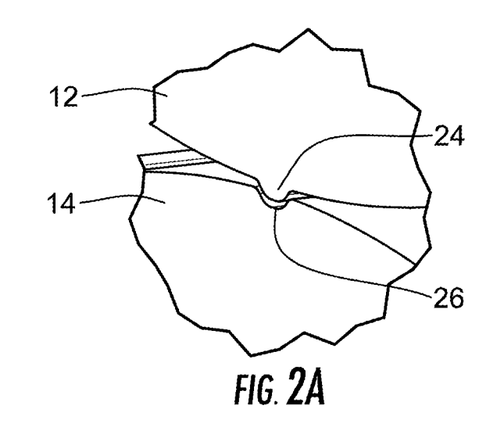
FIG. 2A is an enlarged view of a portion of the cooperating rolls of the roll form apparatus shown in FIG. 2, such as taken at reference 2A-2A of FIG. 2, to better illustrate interacting emboss rib features that create embossment flutes projecting on a first side on the filter media sheet.
Figure 2B:
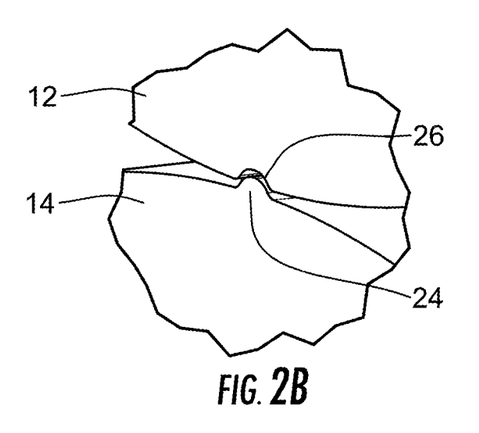
FIG. 2B is an enlarged view of a portion of the cooperating rolls of the roll form apparatus shown in FIG. 2, such as taken at reference 2A-2A of FIG. 2 but with the rolls rotated further than that shown in FIG. 2, to better illustrate interacting emboss rib features that are inverse to those shown in FIG. 2A, that create embossment flutes projecting on a second side on the filter media sheet relative to that of FIG. 2A.
Figure 2C:
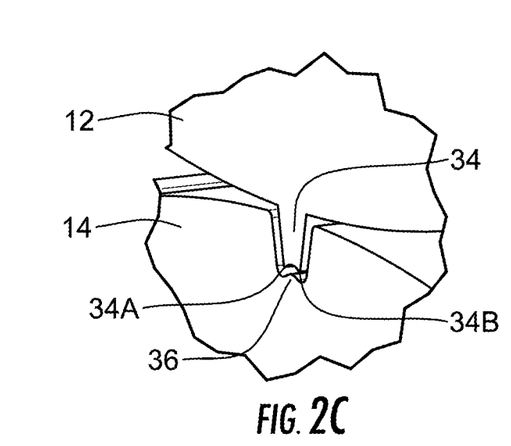
FIG. 2C is an enlarged view of a portion of the cooperating rolls of the roll form apparatus shown in FIG. 2, such as taken at reference 2A-2A of FIG. 2 but with the rolls rotated further than that shown in FIG. 2, to better illustrate interacting score bar features that creases with two crease lines, to be used for creating an upward pleat fold.
Figure 2D:
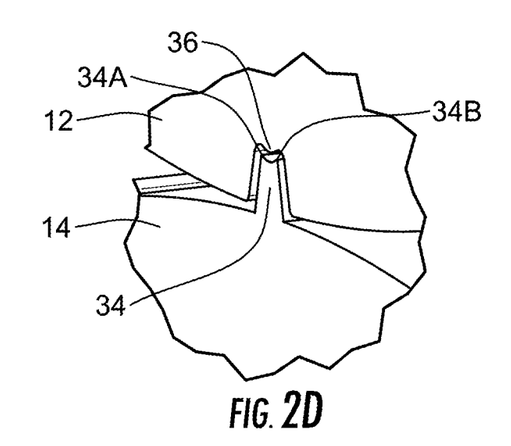
FIG. 2D is an enlarged view of a portion of the cooperating rolls of the roll form apparatus shown in FIG. 2, such as taken at reference 2A-2A of FIG. 2 but with the rolls rotated further than that shown in FIG. 2, to better illustrate interacting score bar features that creases with two crease lines similar to that of FIG. 2C, but inverse, such that it is understood to be used create a downward pleat fold.

Additionally, the upper and lower rolls 12, 14 include corresponding and interacting male score bars 34 and optionally female score bars 36 with a detail of one of the score bars being better shown in FIGS. 2C and 2D, for example. Alternating female and male score bar arrangements can be made as shown in FIGS. 2C and 2D to better facilitate or naturally direct upward and downward folds into the filter media. For example the arrangement of FIG. 2C creates a double crease that folds naturally upward and the arrangement of FIG. 2D creates a double crease that folds naturally downward, with upward and downward folds being shown in FIG. 1. However, it is also contemplated to have a crease that can be folded either upward or downward.

Figure 3:
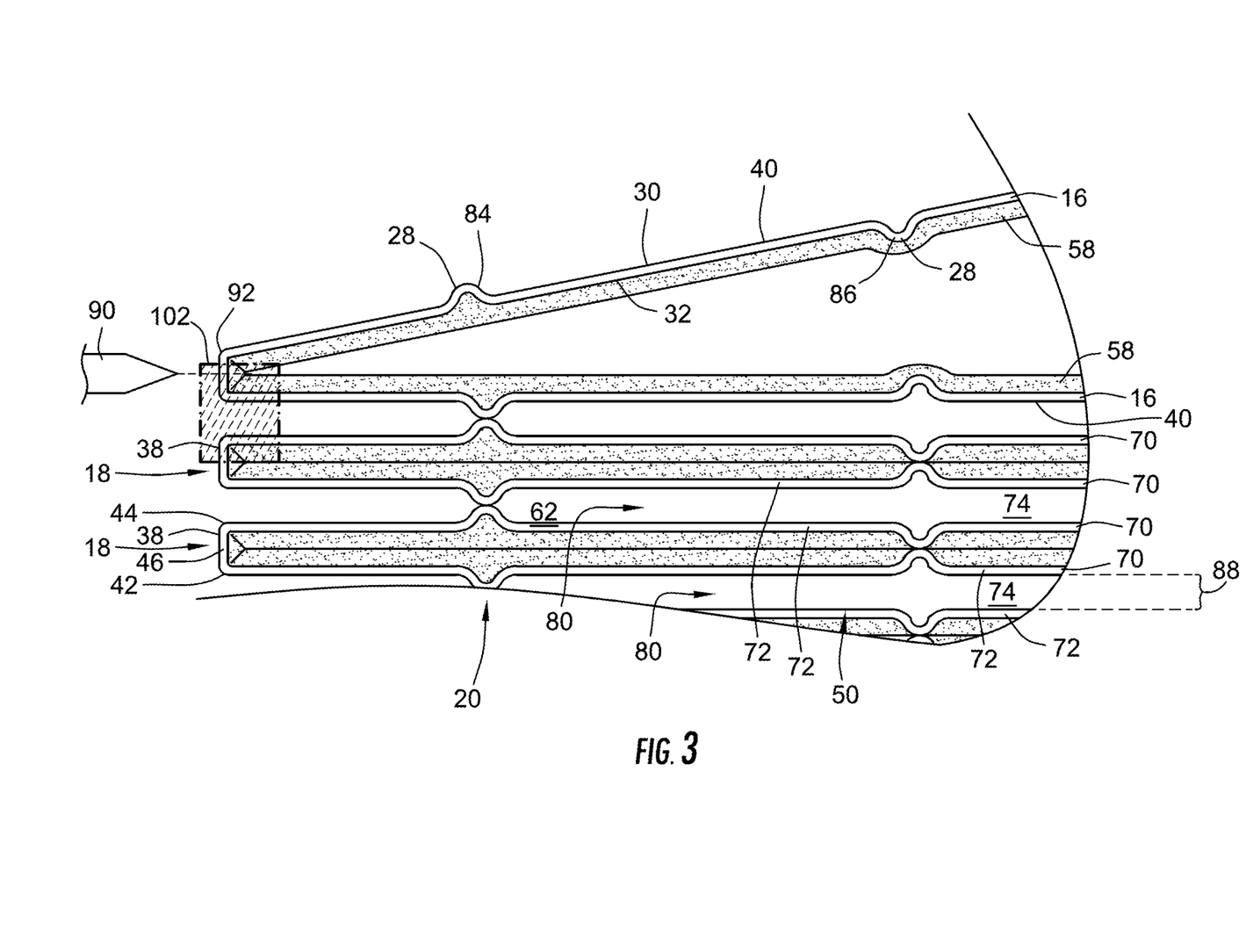
FIG. 3 illustrates an end face view which may be the inlet face of the filter media pack as it is being formed with pleats being gathered together and assembled to form the pack according to the methodology shown in FIG. 1, with one pleat panel being pivoted outward to illustrate how adhesive may be applied continuously, and schematically indicated with a cut line to form a cut side that is subject to an end seal also shown in dashed lines.
Figure 4:
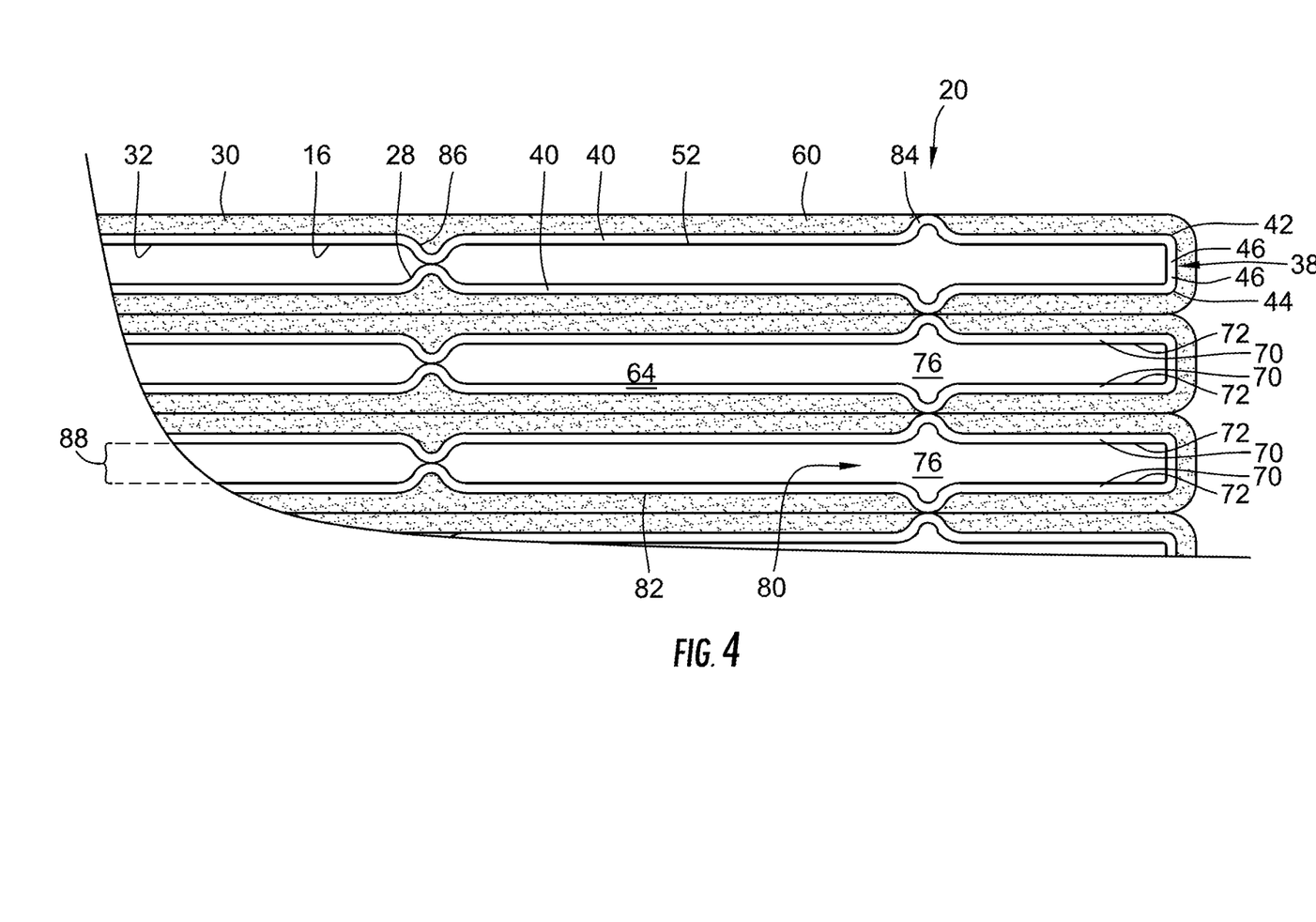
FIG. 4 is an end view of one flow face of a portion of the filter media pack formed by a roll form apparatus of FIG. 1 in which may be for example the same as that of FIG. 3, or in this case designated as the outlet face in FIG. 4.

The score bars form corresponding pleat creases 38 at spaced intervals in order to provide folds for forming the pleats 18. Preferably, each of the rolls 12, 14 include both male score bars and female score bars in alternating fashion to corresponding with upward and downward folds of individual pleat panels 40 of the pleats 18. Further, the corresponding score bars 34, 36 include dual linear creasing projections 34A and 34B (see FIGS. 2C and 2D) to create dual crease lines 42, 44 at each of the pleat creases 38. The projections 34A and 34B are spaced apart such as via a recess region, which creates a flat pleat tip spacer 46 (between the two creases) into the filter media sheet as illustrated in FIGS. 3 and 4, at least according to preferred embodiments even though alternatives including a single pleat crease line is possible or such other variations.

As illustrated, each of the score bars 34, 36 as well as the corresponding embossing ribs 24 and embossing recesses 26 extend axially (and preferably parallel) to the central axes of rotation of the two cooperating rolls 12, 14. By "axially" it is meant the extent is primarily in the axial direction, which may be preferably but not necessarily parallel to the central axis.

The amount of pressing pressure applied by the corresponding rolls 12 and 14 can be controlled via linear actuators 48 which in this embodiment are illustrated preferably as hand control screws that act upon a drive nut to drive the upper roll 12 upwardly or downwardly relative to the lower roll 14 in order to control the amount of applied pressure to the strip of filter media 16. This pressure control mechanism can limit how much the strip of filter media 16 is compacted. Preferably, the filter media 16 is not compressed in the flat regions between the embossments 28 and pleat creases 38, and therefore compressed typically less than 10% of pressing such little or no compaction occurs in these regions to maintain the caliper thickness and loft of the filter media. As a result the airflow capacity is maintained and flow restriction minimized. However, the pressing does and compaction does occur in targeted areas including at mating press locations between the score bars 34, 36 and also between the embossing ribs and recesses 24, 26 to press corresponding crease and emboss features therein.

In the present embodiment, each of the linear actuators 48 in this embodiment comprise manually driven screws that are turned with a drive nut fixed to the upper roll in order to move the upper roll 12 upwardly or downwardly to control the pressing action. Automated actuators and/or spring force via mechanical or pneumatic pressure may alternatively be applied.

Further, the rolls 12, 14 may in some instances be heated well above ambient to better set the pressed features into the strip of filter media 16.

Additionally, it is shown that the roll forming apparatus 10 including the upper roll and lower roll 12, 14 may itself advance the media. However, there may be advancing rolls (not shown) and the like controlling the feed of media to the roll forming apparatus 10 typically upstream (and/or downstream) thereof so as to avoid slippage of filter media being moved through the roll form apparatus 10.

Contrary to typical pleating arrangements, in this instance the corresponding embossments 28 extends axially, and preferably parallel to the corresponding pleat creases 38. Further, unlike typical pleated panel arrangements, adhesive bead applicators 54, 56 apply corresponding beads 58, 60 of sealant adhesive to opposed top and lower sides 30, 32 of the strip of filter media 16 proximate opposite edges 50, 52 of the strip of filter media 16.

Preferably, the adhesive applicators 54, 56 are arranged horizontally and apply the corresponding beads 58, 60 to the strip of filter media 16 while the strip of filter media is being run vertically to ensure good adherence while the adhesive beads are still in a fluid state and before curing of the adhesive. As such, a continuous application of adhesive beads 58, 60 are applied to top and lower surfaces of the filter media sheet such that when the media is gathered at pleat creases and folded together, the adjacent pleat panels 40 are adhesively sealed in alternating fashion at the inlet and outlet faces 62, 64 as illustrated in FIG. 1 (see also FIGS. 3 and 4).

Now that the method of forming the filter media pack has been described, further attention will be had as to the description of the formed filter media pack 20 according to embodiments of the present invention, that is shown formed and being formed in FIGS. 1 and 3 (the pack can be released through a cut through one of the creases) and FIG. 4. A finished formed filter media pack 20 is also shown in FIGS. 5 and 6 as integrated into filter cartridges.

Figure 5:
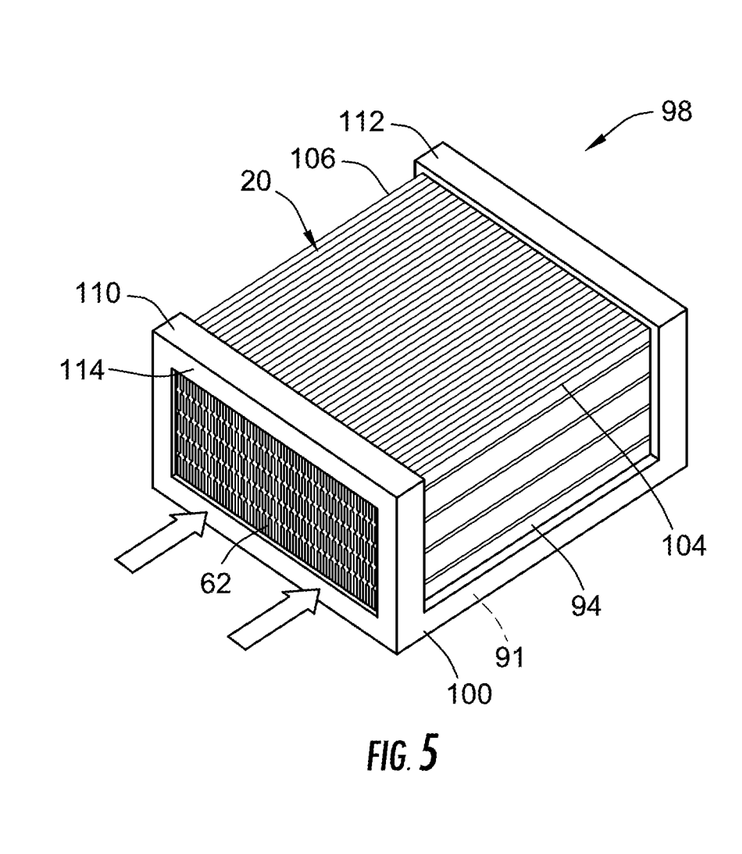
FIGS. 5 and 6 are isometric views of a filter cartridge incorporating the filter media pack created in accordance with the previous figures with FIG. 5 showing the inlet face and FIG. 6 showing the opposite outlet flow face for example.
Figure 6:
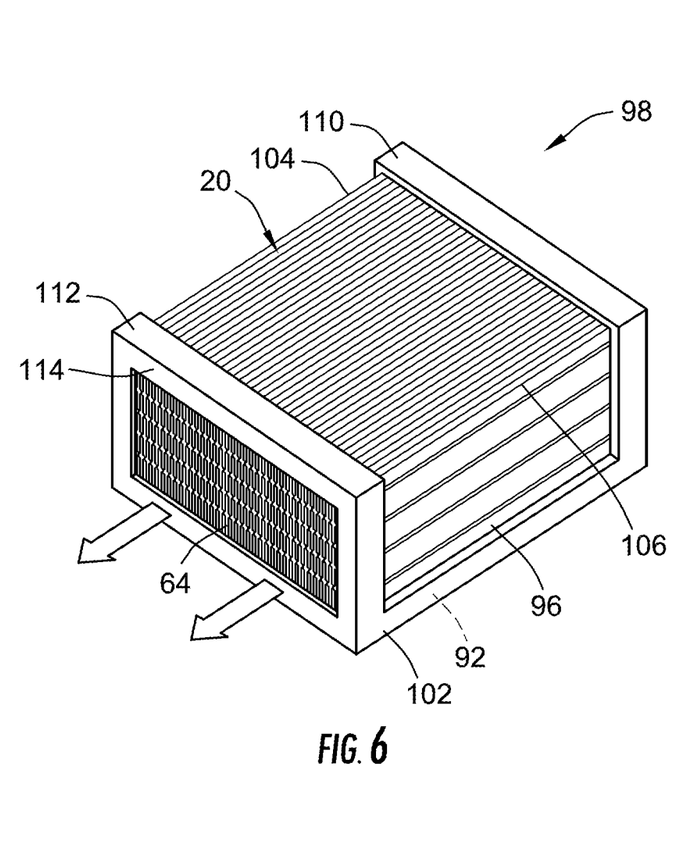

As illustrated, the filter media pack comprises a strip of filter media 16, which is preferably only a single strip that is continuous through the completed filter media pack shown in FIGS. 5 and 6. The strip of the filter media 16 extends between opposed first and second edges that provide inlet and outlet edges 50, 52, that correspond to inlet and outlet faces 62, 64. Further, opposed top and bottom sides 30, 32 are provided in the filter media strip which correspond to the inlet side channels and the outlet side channels depending upon how the filter media pack is employed. The strip is also pleated with the plurality of pleats 18 with a first plurality of pleat tips that are gathered together such as by way of being folded and collected to form a first pleated side 66 and a second plurality of pleat tips that are gathered together along to form a second pleated side 68.

Additionally, a spacer structure is employed for maintaining spacing between the pleat panels. Preferably as shown this is provided by way of embossments 28 that are integrally formed into the strip of filter media 16 and arranged to maintain a spacing of pleat panels 40 apart from each other to facilitate airflow between adjacent pleat panels.

However, in alternative embodiments the spacer structure could be such things as inserts such as a corrugated sheet that is interposed between adjacent pleat panels, a bead of adhesive that runs axially (and preferably parallel) between the inlet face and outlet face e.g. replacing the embossments 28 with adhesive lines or dots or other such structure that is external to the strip of filter media 16 rather than being integrated into the strip of filter media. However, as illustrated the embossments 28 which are integrally formed into the strip of filter media 16 are preferred as this can be done at the same time with a roll form apparatus 10 as crease formation and does not require additional component parts nor does it block or occupy space where otherwise fluid could flow through the filter media to be filtered. Fluid can pass and be filtered through the embossed spacer regions.

Further, the filter media pack 20 includes inlet and outlet flow faces 62, 64 that are not created by the pleat tips but instead are created by the first and second inlet and outlet edges 50, 52 of the strip of filter media 16, with the pleat tips that extend transversely (and preferably perpendicularly) between the inlet face 62 and the outlet face 64. Alternating first pleat panel pairs 70 are closed proximate the inlet face 62 and open proximate the outlet face 64; whereas of second pleat panel pairs 72 are closed proximate the outlet flow face 64 and open proximate the inlet flow face 62. This creates a channeled flow configuration. With this configuration, airflow entering the inlet flow face 62 passes along open inlet flow channels and must pass through the filter media 16 in order to reach the open outlet flow channels that lead to the outlet flow face 64. In this regard, it can be seen that first inlet flow channels 74 are formed between second pleat panel pairs 72 at the inlet face 62 and second outlet flow channels 76 are formed between the first pleat panel pairs 70 as shown at the outlet face 64. In this manner, unfiltered air flow will first enter through the first open inlet flow channels 74 at the inlet flow face 62 and pass through the filter media whereby particulates and contaminants are filtered out by the filter media 16 and then enter the second outlet flow channels 76 whereby filtered airflow is then discharged from the filter media pack 20. This can be seen with respect to FIGS. 5 and 6 for the completed filter media pack 20 with additional reference to FIGS. 3 and 4 representing respective inlet and outlet flow faces 62, 64 of the pack.

To provide for the closures, a variety of closing means may be employed such as crimping the first pleat panel pairs 70 or second pleat panel pairs 72 together and/or welding or bonding these panels together such as by ultrasonic welding or heat application. However, more preferably, sealant is used which may also act in some instances to space the pleat panels apart. For example, the filter media pack according to the preferred embodiment includes a first sealant bead 58 that is applied to the first top side 30 and proximate to the first edge 50 to sealingly close the first pairs 70 of pleat panels proximate the inlet face; and a second sealant bead 60 is applied to these second or lower side 32 of the filter media proximate the second outlet edge 52 to sealingly close the second pairs 72 of pleat panels proximate the outlet face 64.

The sealant beads 58, 60 may comprise various types of adhesives such as hot melt glue, a foaming or non-foaming polyurethane, and other adhesives that can be applied in a fluid state such as shown in FIG. 1 and then subsequently cured when assembled together. Most efficiently the beads 58, 60 are applied in a continuous bead and process as shown in FIG. 1 although it may also be intermittently applied if desired. In the event that the sealant beads 58, 60 have depth that correspond sufficiently to or slightly greater than the desired spacing between pleat panels.

To help set or maintain a desired pleat spacing, the spacer structure such as embossments 28 are arranged to create a pleat spacing (e.g. a spacing between the first pairs 70 or second pairs 72 of pleat panels) typically of at least 2 mm in most preferred embodiments although alternatives are possible, and more typically between 2 mm and 8 mm and most preferably between 2 mm and 4 mm. In roll forming operations, cellulose paper can have embossments with a formed depth typically between about 0.5 mm and 1 mm; and synthetic meters e.g. polyesters, polypropylenes and other thermal plastics and polymers can have embossments with a formed depth of between 2 mm and 8 mm. Blends of cellulose and synthetics can have ranges between that of cellulose and synthetics.

Figure 8:
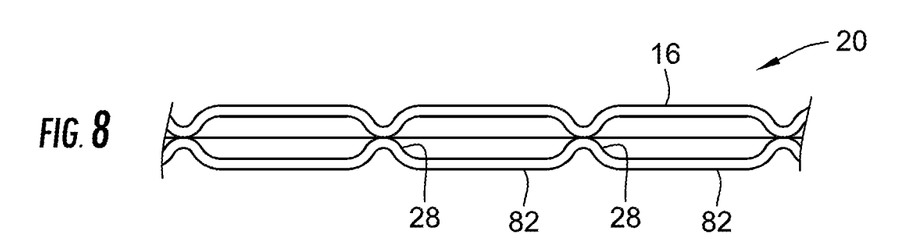
Figure 9:
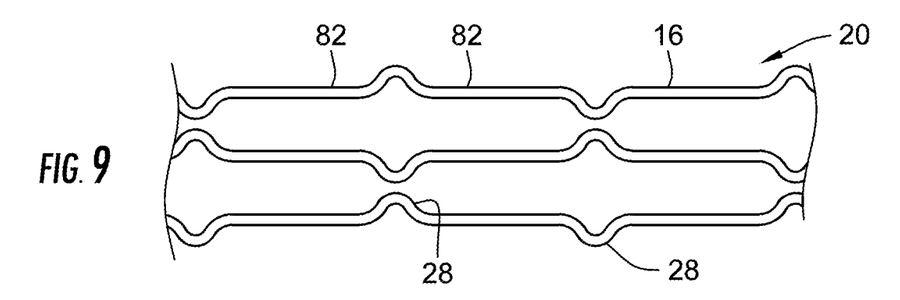

Accordingly, although cellulose paper e.g. paper comprising only or mostly cellulose is less preferred but still can be employed, even where larger pleat spacing is desired the embossments act to prevent blinding off such as shown in the alternative embodiment of FIG. 9, where embossments provide strength and spacer structure that does not necessarily contact adjacent pleat panels. More preferably, synthetic blends and/or pierced synthetic medias may be employed as those typically allow for greater flexibility and greater embossment depth to be formed easily with high-speed roll forming operations. Further direct contact between embossments and adjacent pleat panels is preferred as shown in the primary embodiment of FIGS. 1-6 and also schematically indicated in the alternative embodiments of FIGS. 7, 8, and 10.

As illustrated, the embossments 28 may comprise a plurality of flutes 80 formed into the filter media with the flutes extending axially between the inlet face and the outlet face in either a continuous or discontinuous manner. Similarly, "axially" here means extending primarily in a direction between inlet and outlet flow faces and/or primarily in the same direction (and preferably but not necessarily parallel) with the air flow path between inlet and outlet flow faces. Flutes may be inclined or arranged at an oblique angle but still extending primarily in a direction between inlet and outlet flow faces, and therefore axially extending. Herein, it is illustrated that the flutes 80 are shown to be discontinuous with an intermediate open region however that region could be bridged with the flutes extending continuous.

Further it is seen with reference to FIG. 1 that the single pack illustrated could also be formed into separate packs if it was desired to cut in half between the flutes and seal up or close adjacent pleat panels appropriately as has been described above to create additional inlet and outlet flow faces at the half cut line.

In more preferred embodiments, the embossments have a depth of at least 2 mm with adjacent members of pleat panels being spaced between 2 mm and 8 mm and with flat regions 82 extending preferably a width of at least double the corresponding with of the individual flutes 80 (for example, typically the flat regions 82 span a width of 3-10 times the width of the flutes 80 such as illustrated generally in FIGS. 3-4).

In one embodiment such as the embodiment shown, the filter media pack 20 includes embossments 28 that include both male embossments 84 projecting outwardly along the first side 30 of the filter media sheet and female embossments that project outwardly along the second lower side 32 of the filter media sheet. Further, as shown in FIGS. 3 and 4, corresponding male and female embossments 84, 86 may be aligned with each other once the filter media pack is pleated with adjacent pleat panels coming together such that the male and female embossments 84, 86 abut or arrange to abut and contact each other both at regions between the first pairs 70 of pleat panels as well as between the second pairs 72 of pleat panels as illustrated.

Figure 7:
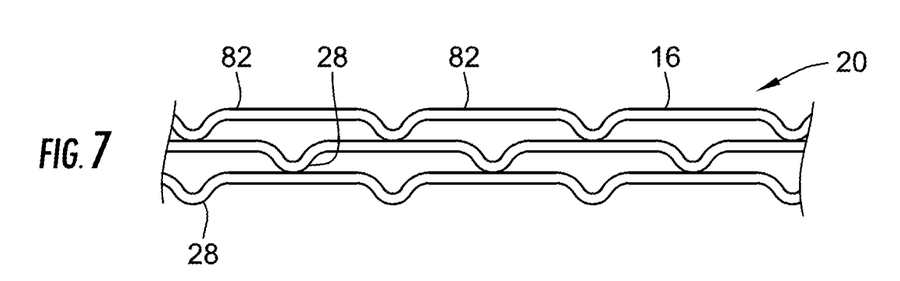
FIGS. 7-10 are schematic cross sectional views of alternative filter media pack arrangements according to embodiments of the present invention to show different embossments patterns that may be substituted in place for the embossment patterns illustrated 1-6. As such, it is understood that disclosure of FIGS. 1-6 applies to these embodiments and vice versa. In particular
Figure 10:
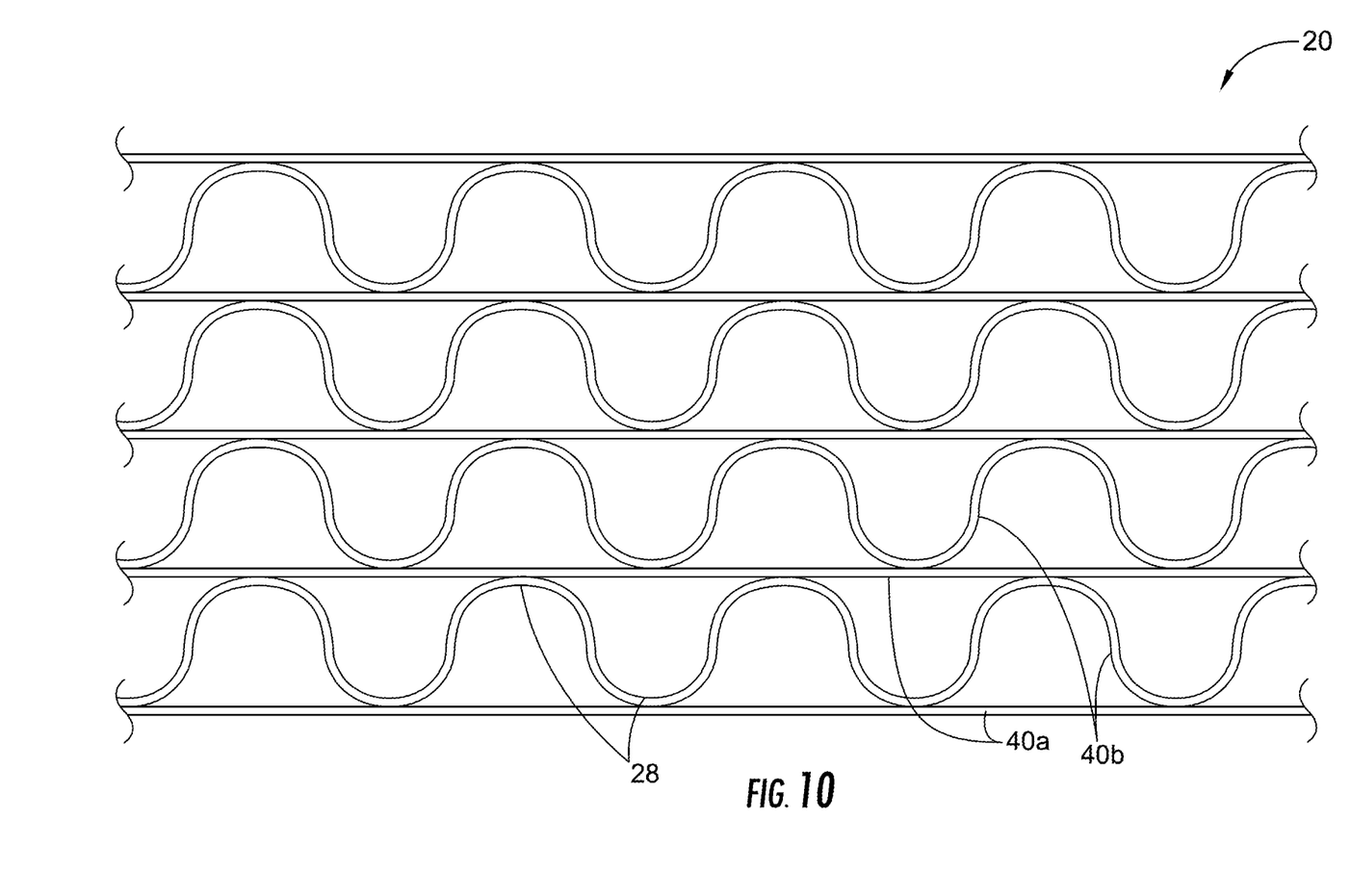

However, as shown in FIGS. 7 and 8 and 10, other embossment arrangements may be substituted in place of those used in FIGS. 1-6 to provide alternative embodiments. The construction and media packs created by any of FIGS. 7-10 are otherwise the same as that of FIGS. 1-6 with alternatively sealed inlet and outlet seal beads. Thus only a different embossing pattern is proposed in alternative embodiments. For example, some pleat panels may be entirely flat such as shown in FIG. 10 with alternating flat pleat panels 40a and embossed pleat panels 40b. FIG. 10 also shows that embossments may be spaced closer together to form flutes, and may optionally be continuously embossed as shown. FIG. 8 shows an alternative embossing pattern with a combination of male embossments 84 only on some pleat panels and female embossments 86 only on other pleat panels. Alternatively as shown in FIG. 7, each pleat panel includes only one type of the male or female embossments 84, 86 but the embossments may be offset rather than aligned with each other. Different combinations of different types of embossments may be used and the length and extent of those may be configured according to different designs as appropriate.

Also illustrated in FIG. 7 and contrary to what is shown in FIGS. 3 and 4, the embossments 84 may contact the flat regions 82 rather than contacting adjacent embossments of the adjacent pleat panel.

The advantage of the first embodiment such as shown in FIGS. 3 and 4 is that the embossments need not be formed as deep which may facilitate higher processing speeds or use of less giving material such as cellulose filter medias. Further, less stretching of the filter media will minimize changes to filter media efficiency and flow characteristics.

For example in FIGS. 3 and 4, an embodiment can be provided with 2 millimeter spacing that may be accomplished simply by embossing each embossment 84, 86 to a depth of 1 mm which combined form a pleat spacing of 2 mm. Further, it is not necessary for the embossments necessarily to interact or have contact with each other but may be arranged with a slight spacing therebetween which may be facilitated by the size and depth of the respective sealant beads 58, and 60 such as shown in FIG. 9 for example whereby the embossments still provide for preventing and maintaining a spacing between pleat panels because if the filter media strip or panels tend to bend the embossments can come into contact with each other and the embossments otherwise provide rigidity to thereby maintain the pleat spacing as appropriate to prevent blinding off. This is shown for example in the FIG. 9 embodiment, but this embodiment also provides a spacer structure maintaining a spacing between pleat panels as broadly contemplated and disclosed herein. This embodiment shown in FIG. 9 also demonstrates that a lower depth of embossments including for example perhaps 0.5 mm may be sufficient (e.g. such as for cellulose) but yet provide for an embodiment were spacing can be maintained at least 2 mm between adjacent pleat panels.

Further, collectively these embodiments show that embossments formed along the first pleat panels may contact embossments formed along the second pleat panels such as shown in FIGS. 3 and 4 wherein the spacing between the panels is also greater than the depth of the embossment as a combination of the embossments along both the first and second pleat panels provide for and define the pleat spacing.

In furtherance of preferred embodiments and while a single crease may be used in some embodiments, each pleat tip provided by pleat crease 38 which may be effected by two different closed adjacent crease lines 42, 44 as facilitated by the dual creasing projections 34A, 34B on the score bars as illustrated in FIGS. 2C and 2D that provides each pleat tip with a flat pleat tip spacer 46. By having at least two adjacent creases by crease lines 42, 44 this can provide each pleat tip with a width of at least 2 mm and preferably between 2 mm and 8 mm to space adjacent members of pleat panels apart. Typically the crease lines 42, 44 (and width span of the pleat tip spacer) match the corresponding pleat spacing as illustrated (e.g. by match it is meant equal to or within 25%).

As a consequence, and the pleat panels 48 they extend perpendicularly between corresponding inlet and outlet flow face, the panels extend without apparent taper or minimal taper that is unlike traditional pleat packs whereby pleat panels with a single crease at pleat tips noticeably have a V shape to them once formed into the form pack. As noted above, preferably the width of the pleat tip spacer 46 portion matches the corresponding pleat panel spacing 88.

With this configuration, substantially greater pleat depths and pack configurations can be provided. For example, the pleat depth that is the depth or span of the pack between the first pleat side 66 and the second pleat side 68 is most typically greater than 2 inches and more preferably greater than at least 6 inches, but typically between 3 and 12 inches (if not greater than 12 inches in some embodiments for very large filters). Therefore, this embodiment is not limited to traditional panel filters where pleat depth is at most 4 inches, and often times 2 inches or less. Instead, pleat depth is anticipated typically to be greater than at least 4 inches in most embodiments herein and unlike traditional pleated panel filter media packs. This is advantageous because the corresponding span is typically desired to be greater than 4 inches in most embodiments.

Further, the filter media strip 16 will typically have a width between the first edge 50 and second edge 52 that more than 4 inches and more often between 6 inches and 20 inches to provide a corresponding matching filter media path depth that extends between the inlet face 62 and the outlet face 64 that is also then between 6 inches and 20 inches. Accordingly, similarly whereas traditional pleat packs and panel form are oftentimes limited to 4 inches which define the distance between the inlet and outlet flow faces, herein much greater distances and spans between the inlet face and the outlet face can be accomplished while still being employed with roll pleating and high-speed processing equipment.

As illustrated in FIG. 1, when the desired size of filter media pack 20 is achieved during pleat gathering and assembly, the filter media sheet is cut, preferably at selected pleat crease lines 42 via a knife 90, which provides the pack with leading and trailing cut edges 91, 92 in spaced apart relation.

Preferably and as illustrated, the cut edges 91, 92 are at corners of the pack and on a same side as illustrated in FIG. 1 and apparent from the sealing of such cut edges in FIGS. 5-6 (described below), although the cut edges could also be at an intermediate location along leading and trailing pleat panels of the pack, or alternatively at corners not on the same side (e.g. kitty corner).

With this arrangement, the strip of the filter media 16 has a first cut side end 94 and an opposite second cut side end 96 as recognized in FIG. 1 and shown in the completed pack and as may be integrated into a filter cartridge 98 as shown in FIGS. 5 and 6.

To avoid leakage at these cut ends axially extending end seals 100, 102 (axial in the sense of being in the general direction of the flow of fluid, such as in an inline filter construction, and/or being traverse and preferably perpendicular to the inlet and outlet faces) are applied along a first side of the filter media pack sealing between adjacent pleat panels at the first cut side end 94, and along a second side of the filter media pack sealing between adjacent pleat panels at the first cut side end 96. These seals 100, 102 typically comprise adhesive such as hotmelt, glue or other adhesive, and more preferably comprise polyurethane that may expand or other expanding adhesives so as to fill voids in those regions. These seals 100, 102 may be applied in a bead, or may be molded-in-place into a form. A molded seal may also provide some additional structural integrity in the axial direction.

If desired, the other free corners 104, 106 may also optionally have applied axial extending structure the same as end seals 100, 102 (e.g. applied or molded-in-place axial support strips), however at these free corner locations no sealing is needed. However, such similar adhesive structures at free corners 104, 106 can provide additional axial support if desired.

With the foregoing, a method of forming the filter media pack is provided that includes roll forming (indicated generally at reference 107 in FIG. 1) the strip of the filter media 16 to include a plurality of pleat creases 38 and optionally a plurality of embossments 28 to provide for the spacer structures. The roll forming operation can be accomplished in one step as illustrated in FIG. 1 with a single set of rolls 12, 14 as shown, although more than one set of rolls can be used to perform this roll forming method in other embodiments.

The method also includes pleating the filter media (e.g. indicated generally by reference 108 in FIG. 1) by folding the strip of filter media 16 at the plurality of pleat creases 38 to form the pleat panels.

The method also includes sealing between the first pairs of pleat panels proximate the inlet flow face and between the second pairs of pleat panels proximate the outlet flow face. This may be accomplished by any of the methods described above to include but not limited to application of sealant beads 58, 60 by the adhesive applicators 54, 56.

The filter media pack 20 is typically integrated into a filter cartridge 98 that can be replaceably installed into a housing or duct. The filter cartridge comprises the filter media pack 20 as described above and may further comprise an inlet border frame 110 around the inlet face of the filter media pack; and/or an outlet border frame 112 around the outlet face of the filter media pack. The inlet and/or outlet border frame(s) 110, 112 may comprise either a preformed border frame structure that may be placed and preferably adhesively attached at the rectangular corners at the inlet and/or outlet face, or more preferably a form in place rectangular border frame structure such as mold-in-place adhesive such as foamed polyurethane or plastisol or other curing adhesive.

Either or both of the inlet and/or outlet border frame(s) 110, 112 may provide for a housing seal surface 114 that forms a continuous sealing ring located at a periphery of the filter media pack and extending around the pack to prevent unfiltered fluid flow between the inlet face and the outlet face.

For example, if the border frame is made of sealing material such as plastisol or more preferably foamed polyurethane, the housing seal surface 114 can form a continuous ring seal against a housing or duct surface of an air cleaner (not shown) to seal against airflow and prevent leakage when employed in use as a filter cartridge.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter media pack, comprising:
a strip of a filter media extending between a first edge and a second edge, and having a first side and second side, the strip being pleated to provide a first plurality of pleat tips and a second plurality of pleat tips with pleat panels extending between pleat tips;
a spacer structure maintaining a spacing between pleat panels;
flow faces including an inlet flow face created by the first edge and an outlet flow face created by the second edge, with the pleat tips extending transversely between the inlet flow face and the outlet flow face, with alternating first pairs of pleat panels being closed proximate the inlet flow face and second pairs of pleat panels being closed proximate the outlet flow face, and
at least one sealant bead applied along at least one of the flow faces that sealingly closes the first pairs of pleat panels proximate at least one of the flow faces, wherein the at least one sealant bead spaces respective portions of adjacent pleat panels apart in spaced relation.

2. The filter media pack of claim 1, wherein the spacer structure comprises a plurality of embossments integrally formed into the strip of the filter media and arranged to maintain a spacing of pleat panels.

3. The filter media pack of claim 2, wherein the embossments are arranged to create a pleat spacing of at least 2 millimeters.

4. The filter media pack of claim 2, wherein the embossments include male and female embossments formed into the filter media sheet, with the male embossments projecting outwardly along the first side and the female embossments projecting outwardly along the second side.

5. The filter media pack of claim 2, wherein flat regions of the filter media are formed between adjacent embossments, wherein the embossments of a first pleat panel contact flat regions along a second pleat panel.

6. The filter media pack of claim 2, wherein embossments formed along first pleat panels contact embossments formed along second pleat panels, wherein spacing between pleat panels is greater than a depth of the embossments as a combination of the embossments along both the first pleat panels and second pleat panels.

7. The filter media pack of claim 1, wherein the at least one sealant bead comprises:
   a first sealant bead applied to the first side proximate the first edge to sealingly close the first pairs of pleat panels proximate the inlet flow face, the first sealant bead defining a first width matched to the spacing between pleat panels; and
   a second sealant bead applied to the second side proximate the second edge to sealingly close the second pairs of pleat panels proximate the outlet flow face, the second sealant bead defining a second width matched to the spacing between pleat panels.

8. The filter media pack of claim 1, wherein the pleated strip comprises a pleat depth of at least 4 inches.

9. The filter media pack of claim 1, wherein the strip has a width extending between the first edge and the second edge of between 6 inches and 20 inches to provide a matching filter media pack depth extending between the inlet flow face and the outlet flow face.

10. The filter media pack of claim 1, wherein the strip of the filter media has a first cut side end and a second cut side end, further comprising a first end seal along a first side of the filter media pack sealing between adjacent pleat panels at the first cut side end, and a second end seal along a second side of the filter media pack sealing between adjacent pleat panels at the second cut side end.

11. The filter media pack of claim 1, wherein the spacer structure comprises at least one of: (a) adhesive spacer beads laid upon the filter media, and (2) a structural insert separate from the strip of the filter media that is inserted between adjacent members of pleat panels.

12. The filter media pack of claim 1, wherein the spacer structure spaces adjacent members of pleat panels at a central location between the first edge and the second edge by at least 2 millimeters.

13. A method of forming the filter media pack of claim 1 comprising:
   roll forming the strip of the filter media to include a plurality of pleat creases and a plurality of embossments to provide for the spacer structures;
   pleating the filter media by folding the filter media at the plurality of pleat creases to form the pleat panels;
   sealing between the first pairs of pleat panels proximate the inlet flow face and between the second pairs of pleat panels proximate the outlet flow face.

14. The method of claim 13, wherein the roll forming comprises use of two cooperating rolls that rotate together to press the filter media therebetween with at least one score bar and a plurality of embossing bars on at least one of the two cooperating rolls, to form the corresponding creases and the embossments into the filter media in a single stage operation, the at least one score bar and the plurality of embossing bars extending axially relative to central axes of rotation of the two cooperating rolls.

15. The method of claim 14, wherein each of the two cooperating rolls include embossing bars.

16. The method of claim 14, wherein the sealing comprises applying an adhesive bead to the first and second sides in a horizontal direction while the strip of the filter media being advanced in a vertical direction, the applying being conducted before the folding that forms the pleat panels.

17. The method of claim 14, further comprising, cutting the strip of the filter media to create a first cut side end and a second cut side end, and sealing sides of the filter media pack along the first cut side and the second cut side between opposite sides of the pleat panels that extend between the inlet flow face and the outlet flow face.

18. A filter cartridge arrangement comprising the filter media pack of claim 1, further comprising, an inlet border frame around the inlet flow face of the filter media pack; and an outlet border frame around the outlet flow face of the filter media pack.

19. A filter cartridge arrangement comprising the filter media pack of claim 1, further comprising a housing seal at a periphery of the filter media pack and extending around the pack to prevent unfiltered fluid flow between the inlet flow face and the outlet flow face.

20. The filter cartridge arrangement of claim 19, wherein the strip of the filter media has a first cut side end and a second cut side end, further comprising a first end seal along a first side of the filter media pack sealing between adjacent pleat panels at the first cut side end, and a second end seal along a second side of the filter media pack sealing between adjacent pleat panels at the second cut side end.

21. A filter media pack, comprising:
   a strip of a filter media extending between a first edge and a second edge, and having a first side and second side, the strip being pleated to provide a first plurality of pleat tips and a second plurality of pleat tips with pleat panels extending between pleat tips;
   a spacer structure maintaining a spacing between pleat panels;
   flow faces including an inlet flow face created by the first edge and an outlet flow face created by the second edge, with the pleat tips extending transversely between the inlet flow face and the outlet flow face, with alternating first pairs of pleat panels being closed proximate the inlet flow face and second pairs of pleat panels being closed proximate the outlet flow face,
   wherein the spacer structure comprises a plurality of embossments integrally formed into the strip of the filter media and arranged to maintain a spacing of pleat panels, wherein the embossments comprise a plurality of flutes formed into the filter media, the flutes extending between the inlet flow face and the outlet flow face in either a continuous or discontinuous manner, and wherein the flutes extend into at least one of the flow faces to maintain pleat spacing through at least one of the flow faces.

22. The filter media pack of claim 21, wherein the flutes extend into both of the inlet flow face and the outlet flow face to maintain pleat spacing through both of the inlet flow face and the outlet flow face.

23. The filter media pack of claim 21, wherein the flutes have a depth of at least 2 millimeters, adjacent members of pleat panels being spaced between 2 and 8 millimeters, and wherein flat regions of the filter media are arranged between adjacent members of pleat panels, the flat regions extending a width at least twice a width span of the embossments.

24. A method of forming the filter media pack of claim 21 comprising:

roll forming the strip of the filter media to include a plurality of pleat creases and a plurality of embossments to provide for the spacer structures;

pleating the filter media by folding the filter media at the plurality of pleat creases to form the pleat panels;

sealing between the first pairs of pleat panels proximate the inlet flow face and between the second pairs of pleat panels proximate the outlet flow face.

25. A filter media pack, comprising:

a strip of a filter media extending between a first edge and a second edge, and having a first side and second side, the strip being pleated to provide a first plurality of pleat tips and a second plurality of pleat tips with pleat panels extending between pleat tips;

a spacer structure maintaining a spacing between pleat panels;

an inlet flow face created by the first edge and an outlet flow face created by the second edge, with the pleat tips extending transversely between the inlet flow face and the outlet flow face, with alternating first pairs of pleat panels being closed proximate the inlet flow face and second pairs of pleat panels being closed proximate the outlet flow face, and wherein each pleat tip is formed by at least two creases, the creases extending between the inlet flow face and the outlet flow face to provide a pleat tip with a width of at least 2 millimeters to space adjacent members of pleat panels apart.

26. A method of forming the filter media pack of claim 25 comprising:

roll forming the strip of the filter media to include a plurality of pleat creases and a plurality of embossments to provide for the spacer structures;

pleating the filter media by folding the filter media at the plurality of pleat creases to form the pleat panels;

sealing between the first pairs of pleat panels proximate the inlet flow face and between the second pairs of pleat panels proximate the outlet flow face.

27. A filter media pack, comprising:

a continuous strip of a filter media extending between edges including a first edge and a second edge, and having a first side and second side, the continuous strip being pleated to provide a first plurality of pleat tips and a second plurality of pleat tips with pleat panels extending between pleat tips, wherein the continuous strip comprises a pleat depth greater than 2 inches;

a plurality of embossments integrally formed into the continuous strip of the filter media, the embossments projecting along the pleat panels wherein flat regions of the filter media are arranged between embossments and wherein at least one of the edges interests embossment;

an inlet flow face created by the first edge and an outlet flow face created by the second edge, with the pleat tips extending transversely between the inlet flow face and the outlet flow face, with alternating first pairs of pleat panels being closed proximate the inlet flow face and second pairs of pleat panels being closed proximate the outlet flow face;

a first sealant bead applied to the first side proximate the first edge to sealingly close the first pairs of pleat panels proximate the inlet flow face; and a second sealant bead applied to the second side proximate the second edge to sealingly close the second pairs of pleat panels proximate the outlet flow face.

28. The filter media pack of claim 27, wherein the continuous strip comprises a pleat depth is that is at least 4 inches, and wherein the embossments have a depth of at least 2 millimeters, wherein the embossments comprise a plurality of flutes formed into the filter media, the flutes extending between the inlet flow face and the outlet flow face in either a continuous or discontinuous manner, and wherein the continuous strip has a width extending between the first edge and the second edge of between 6 inches and 20 inches to provide a matching filter media pack depth extending between the inlet flow face and the outlet flow face.

29. The filter media pack of claim 27, wherein the embossments provide spacer structures maintaining a spacing between pleat panels by being arranged to contact embossments projecting along pleat panels and/or by being arranged to contact the flat regions on the adjacent member of the pleat panels, and wherein the embossments are either continuous or discontinuous and intersect both of the first edge and the second edge.

30. The filter media pack of claim 27, wherein each pleat tip is formed by at least two creases, the creases extending between the inlet flow face and the outlet flow face to provide a pleat tip with a width of at least 2 millimeters to space adjacent members of pleat panels apart.

31. The filter media pack of claim 27, wherein the continuous strip of the filter media has a first cut side end and a second cut side end, further comprising a first end seal along a first side of the filter media pack sealing between adjacent pleat panels at the first cut side end, and a second end seal along a second side of the filter media pack sealing between adjacent pleat panels at the second cut side end.

* * * * *